United States Patent [19]
Hoover

[11] 3,910,956
[45] Oct. 7, 1975

[54] MARK-FORMING RECORD MATERIALS

[75] Inventor: Troy Eugene Hoover, Kettering, Ohio

[73] Assignee: NCR Corporation, Dayton, Ohio

[22] Filed: June 29, 1972

[21] Appl. No.: 267,283

Related U.S. Application Data

[62] Division of Ser. No. 90,098, Nov. 16, 1970, Pat. No. 3,787,325.

[52] U.S. Cl. .................................. 260/335; 117/36.2
[51] Int. Cl.² ......................................... C07D 311/86
[58] Field of Search ..................................... 260/335

[56] References Cited
UNITED STATES PATENTS
3,514,310  5/1970  Kimura et al. ..................... 260/335

OTHER PUBLICATIONS

Chemical Abstracts, Vol. 71, 51235d (1969).

*Primary Examiner*—Norma S. Milestone
*Attorney, Agent, or Firm*—Robert J. Shafer; E. Frank McKinney

[57] ABSTRACT

A chromogenic compound of normally colorless form is disclosed which is colorable to forms such as orange-red or red when brought into reactive contact with an acidic material. Examples of these chromogenic compounds include 6'-diethylamino-2'-thiomethylfluoran.

2 Claims, No Drawings

MARK-FORMING RECORD MATERIALS

This is a division of application Ser. No. 90,098, filed Nov. 16, 1970, issued Jan. 22, 1974, bearing U.S. Pat. No. 3,787,325.

This invention relates to chromogenic compounds for use in pressure sensitive record material.

Throughout this application, it is to be understood that the fluoran dyes (chromogenic compounds) are substantially colorless until reacted with an acidic material.

Pressure sensitive, mark-forming systems of the prior art provide a marking system of disposing on and/or within sheet support material, mutually reactant but unreacted mark-forming components (at least one component of which is a polymeric material) and a liquid solvent in which each of the mark-forming components is soluble, —said liquid solvent being present in such form that it is maintained isolated by a pressure-rupturable barrier from at least one of the mark-forming components until an application of pressure causes a breach or rupture of the barrier in the area delineated by the pressure pattern. The mark-forming components thereby are brought into reactive contact, producing a distinctive mark.

Orange-red to red chromogenic compounds now have been discovered. These chromogenic compounds also can be pink, purple or orange in color. The compounds of this invention having chromogenic properties can be incorporated in a web or coated onto the surface of a web to provide a manifolding unit, which is useful in carrying out methods of marking involving reactive contact with a color-activating material to yield dark-colored reaction products in areas where marking is desired.

The chromogenic compounds of this invention are represented by the formula:

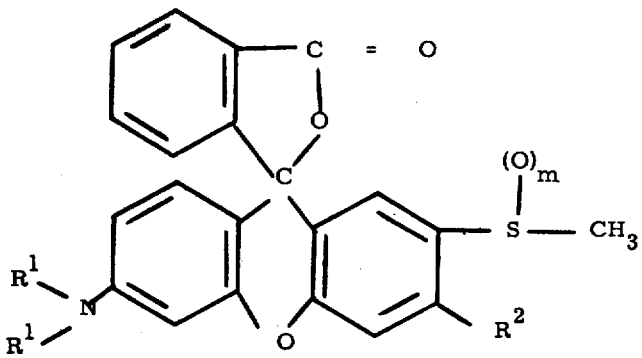

wherein $R^1$ is hydrogen, methyl or ethyl and $R^2$ is hydrogen, methyl, ethyl or chlorine and m is zero or the integer one or two.

Specific examples of the compounds that have been prepared are:

6'-diethylamino-2'-thiomethylfluoran;
6'-diethylamino-3'-methyl-2'-thiomethylfluoran;
6'-diethylamino-2'-methylsulfoxidefluoran; and
6'-diethylamino-2'-methylsulfonefluoran.

The method of marking of this invention, i.e., the method of developing a dark-colored material from substantially colorless or slightly colored chromogenic compounds, comprises providing a chromogenic compound selected from among the above-described compounds and bringing such compounds into reactive contact with an acidic color-activating substance, in areas where marking is desired, to produce a dark-colored form of the compound by the action thereon of said acidic substance.

Acidic materials employed in this invention can be any compound within the definition of a Lewis acid, i.e., any electron acceptor. Preferably, acidic organic polymers such as phenolic polymers are employed as the acidic material.

The bottom surface of the overlying sheet is supplied on the surface or near the surface with a multiplicity of minute pressure-rupturable microcapsules containing a solution of the substantially colorless chromogenic compound. An acidic component, such as an acid clay or a phenolic polymeric material lies within the lower web or undersheet or upon the upper surface of the lower web or undersheet. A mark is made by the use of a stylus, a type character, or other pressure-exerting means applied to the two-sheet unit manifold.

The encapsulated solution is released on the event of rupture of the capsules in writing operations. The released solution is transferred from the overyling or base-sheet to the receiving surface of the underlying sheet in conformance with the pressure pattern of the writing operation. The top of the underlying sheet is coated or impregnated with a material reactant with the chromogenic materials, e.g., an acid clay or an acidic phenolic polymer material; and the capsules are present on the overlying or base-sheet which capsules contain a liquid solution of the chromogenic compounds. In another embodiment of the record material, however, the capsules can contain the polymeric phenolic material in liquid solution and the receiving surface of the underlying sheet can be supplied with the chromogenic materials.

It is possible to incorporate the chromogenic materials in a solid, crystalline state in a binder material so that the chromogenic materials can be transferred from the overlying sheet, upon the application of pressure, to deposit some of the chromogenic materials on the receiving surface of the undersheet, which receiving surface carries a color-activating polymeric material. Preferably, the chromogenic substances are dissolved in an appropriate solvent and minute, rupturable, capsules. It is apparent that many other arrangements are possible, including different configurations and relationships of the solvent and all of the mark-forming materials with respect to their encapsulation and location on the supporting underlying or overlying sheets or webs can be envisioned.

It is noted that the polymeric mark-forming components have a common solubility with the chromogenic materials in at least one liquid solvent when the acid-reacting material is a phenolic or other acidic organic polymer. Several polymeric materials also can be reactively contacted with the chromogenic compounds.

As mentioned above, the solvent can be maintained in physical isolation in minute droplets until such time as it is released by application of pressure. This can be accomplished by several known techniques, but, preferably, isolation is maintained by encapsulation of individual droplets of the solvent in a microcapsule according to the procedures described, for example, in U.S. Pat. Nos. 2,712,507, issued July 5, 1955 on the application of Barrett K. Green; 2,730,457, issued Jan. 10, 1956 on the application of Barrett K. Green and Lowell Schleicher; 2,800,457, issued July 23, 1957 on the application of Barrett K. Green and Lowell Schleicher; 2,800,458, issued July 23, 1957 on the application of Barrett K. Green, re-issued as U.S. Pat. No. Re. 24,899 on Nov. 29, 1960; and U.S. Pat. No. 3,041,289 issued June 26, 1962 on the application of Bernard Katchan and Robert E. Miller. The microscopic capsules, when disposed within or upon a supporting web as a multiplicity in contiguous juxtaposition, are rupturable by pressure, such as normal marking pressure found, for example, in writing or typing operations.

The material or materials chosen as the wall material for the droplet-containing microcapsules, in addition to being pressure rupturable, must be inert or unreactive with respect to the intended contents of the capsules and the other mark-forming components so that the capsule wall material will remain intact under normal storage conditions until such time as it is released by an application of marking pressure. Preferred examples of eligible capsule wall materials include gelatin, gum arabic and many others thoroughly described in the aforementioned patents.

For most uses in record material, the capsule size does not exceed about 50 microns in diameter. Preferably, the capsules are smaller than about 15 microns in diameter.

The acidic organic polymeric material useful for developing the color of chromogenic compounds in this invention include phenolic polymers, phenol acetylene polymers, maleic acid-rosin resins, partially or wholly hydrolyzed styrene-maleic anhydride copolymers and ethylene-maleic anhydride copolymers, carboxy polymethylene and wholly or partially hydrolyzed vinylmethylether-maleic anhydride copolymer and mixtures thereof.

More specifically, phenolic polymers found useful include alkyl-phenol acetylene resins, which are soluble in common organic solvents and possess permanent fusibility in the absence of being treated by cross-linking materials. Another specific group of useful phenolic polymers are members of the type commonly referred to as "novolacs," (a type of phenol-formaldehyde polymeric material) which are characterized by solubility in common organic solvents and which are, in the absence of cross-linking agents, permanently fusible. Resol resins, if they are still soluble, can be used, though they are subject to change in properties upon aging. Generally, phenolic polymer material found useful in practicing this invention is characterized by the presence of hydroxyl groups and by the absence of groups such as methylol, which tend to promote infusibility or cross-linking of the polymer, and further, by being soluble in organic solvents and relatively insoluble in aqueous media. Again, mixtures of these organic polymers and other acidic materials can be employed.

A laboratory method useful in the selection of suitable phenolic resins is the determination of the infrared absorption pattern. It has been found that phenolic resins which undergo absorption in the 3,200–3,500 $cm^{-1}$ region (which is indicative of hydroxyl groups) on the resin molecules and which do not absorb in the 1,600–1,700 $cm^{-1}$ region are eligible. This latter absorption region is indicative of desensitization of hydroxyl groups which desensitization renders such groups unavailable for reaction with the chromogenic materials.

The preparation of some organic polymeric materials useful for practicing this invention has been described in "Industrial and Engineering Chemistry," Volume 43, Pages 134 to 141, January 1951, and a particular polymer thereof is described in Example I of U.S. Pat. No. 2,052,093, issued to Herbert Honel on Aug. 25, 1936. The preparation of the phenol-acetylene polymers has been described in "Industrial and Engineering Chemistry," Volume 41, Pages 73 to 77, January 1949. The preparation of maleic anhydride copolymers is described in the literature, such as, for example, one of the maleic anhydride vinyl copolymers, as disclosed in "Vinyl and Related Polymers," by Calvin E. Schlidknecht, Second printing, published April 1959, by John Wiley & Sons, Incorporated: See pages 65 to 68 (styrene-maleic anhydride copolymer), 530 to 531 (ethylene-maleic anhydride copolymer), and 628 to 630 (vinylmethylethermaleic anhydride copolymer).

When the acidic material used as a mark-forming component in the present invention is one of the aforementioned organic polymers, the liquid solvent chosen must be capable of dissolving it. Examples are diphenyl ether, biphenyl, chlorinated biphenyl and saturated hydrocarbons. The solvent can be volatile or nonvolatile, and a single - or multiple-component solvent can be used which is wholly or partially volatile. Examples of volatile solvents useful in practicing the present invention include toluene, petroleum distillate, perchloroethylene, and xylene. Examples of nonvolatile solvents include high-boiling-point petroleum fractions and chlorinated biphenyls. Generally, the solvent chosen should be capable of dissolving at least about 0.3 per cent, by weight, of the chromogenic materials, and at least about 3 to 5 per cent, by weight, of the acidic polymeric material to yield an effective reaction. However, in the preferred system, the solvent should be capable of dissolving an excess of the polymeric material, so as to provide every opportunity for utilization of the chromogenic materials.

A further criterion for selection of the solvent is that the solvent must not interfere with the mark-forming reaction. In some instances, the presence of the solvent interferes with the mark-forming reaction or diminishes the intensity of the mark, in which instances the solvent chosen is sufficiently volatile to assure its removal from the reaction site soon after having brought the mark-forming components into reactive contact so that the mark-forming reaction can proceed.

Since the mark-forming reaction requires that an intimate mixture of the components be brought about through solution of said components, one or more of the mark-forming components can be dissolved in solvent droplets isolated by encapsulation, the only requirement being that at least one of the components essential to the mark-forming reaction be maintained isolated until the mark-forming reaction is desired.

In the usual case, the mark-forming components are so chosen as to produce a mark upon application of pressure to a coated system of sheets at room temperature (20° to 25° centigrade). However, the present invention also includes a system wherein the solvent component is not liquid at temperatures near room temperature but is liquid and in condition for forming solutions only at elevated temperatures.

The support sheet member on which components of the system are disposed can comprise a single or a dual sheet assembly. In the case where all components are disposed on a single sheet, the record material is referred to as a "self-contained" or autogenous system. Where there must be a migration of solvent, with or without the mark-forming component, from one sheet to another, the record material is referred to as a "transfer" system. (Such a system may also be referred to as a "two-fold" system, in that at least two sheets are required and each sheet includes a component, or components, essential to the mark-forming reaction.) Where an adequate amount of the colored reaction product is produced in liquid or dissolved form on a surface of one sheet, a mark can be recorded on a second sheet by transfer of the reaction product.

In a preferred case, where microcapsules are employed, they can be present in the sheet support material either disposed therethroughout or as a coating thereon, or both. The capsules can be applied to the sheet material as a dispersion in the liquid vehicle in which they were manufactured, or if desired, they can be separated from the vehicle and thereafter dispersed in a solution of the acid-reacting polymeric component (for instance, 30 grams of water and 53 grams of a 1 per cent, by weight, aqueous solution of polyvinylmethylether-maleic anhydride) to form a sheet-coating composition in which, because of the inertness of the solution and the capsules, both components retain their identity and physical integrity. When this composition is disposed as a film on the support material and dried, the capsules are held therein subject to release of the contained liquid by rupture of the capsule walls. The latter technique, relying on the inertness of the microcapsule and the dispersing medium of the film-forming mark-forming polymeric component, provides a method for preparing a sensitive record material coating having the capsules interspersed directly in a dry film of the polymeric material as the film is laid down from solution. A further alternative is to disperse one or more mark-forming components, and the chromogenic material containing microcapsules in a liquid medium not a solvent for either the mark-forming component or the microcapsules, with the result that all components of the mark-forming system are disposed on or within the support sheet in the one operation. Of course, the several components can be applied individually. The capsules also can be coated onto a sheet as a dispersion in a solution of polymeric material which is not necessarily reactive with the capsule-contained solution of the chromogenic materials.

The respective amounts of the several components can be varied according to the nature of the materials and the architecture of the record material unit desired or required. Suitable lower amounts include, in the case of the chromogenic materials, about 0.005 to 0.075 pounds per ream (a ream in this application meaning 500 sheets of 25 × 38 inch paper, totalling 3,300 square feet); in the case of the solvent, about 1 to 3 pounds per ream. In all instances, the upper limit is primarily a matter of economic consideration.

The slurry of capsules can be applied to a "wet" web of paper, for example, as it exists on the screen of a Fourdrinier paper machine, so as to penetrate the paper web a distance depending on the freeness of the pulp and the water content of the web at the point of application. The capsules can be placed directly in or on a paper or support sheet. Not only capsule structures, but continuous films which contain a multitude of microscopic, unencapsulated, droplets for local release in an area subject to pressure can be utilized. (See for example, U.S. Pat. No. 2,299,694 which issued Oct. 20, 1942, on the application of Barrett K. Green.)

With respect to the acidic organic polymeric component, a solution thereof in an evaporable solvent can be introduced into an amount of water and the resulting mixture can be agitated while the evaporable solvent is blown off by an air blast. This operation leaves an aqueous colloidal dispersion slurry of the polymeric material, which can be applied to finished paper so as to leave a surface residue, or the slurry can be applied to a wet web of paper or at the size-press station of a paper making machine. In another method for making a polymer-sensitized sheet, the water-insoluble polymer can be ground to a desired or required particle size in a ball mill with water, preferably with a dispersing agent, such as a small quantity of sodium silicate. If a binder material of hydrophilic properties is ground with the polymeric material, the binder itself may act as a dispersant. If desired, an amount of binder material of up to 40 per cent, by weight, of the amount of polymeric material can be added to the ball-milled slurry of materials; —such binder materials being of the paper coating binder class, including, for example, gum arabic, casein, hydroxyethyl-cellulose, and latexes (such as styrene-butadiene copolymer). If desired, oil absorbents in the form of fuller's earths can be combined with the polymeric material particles to assist in retaining, in situ, the liquid droplets of chromogenic materials solution to be transferred to it in data-representing configuration, for the purpose of preventing "bleeding" of the print.

Another method for applying the chromogenic or polymeric material individually to a single sheet of paper is by immersing a sheet of paper in 1–10 per cent, by weight, solution of the material in an evaporable solvent. Of course, this operation must be conducted individually for each reactant, because if the other reactant material were present, contact of the reactants would result in a premature coloration over the sheet area. A dried sheet with one component can then be coated with a solution of another component, the solvent of which is a non-solvent to the already-supplied component.

The polymeric material can also be dissolved in ink composition vehicles to form a printing "ink" of colorless character and, thus, can be used to spot-print a proposed record-sheet-unit sensitized for recording, in a reaction-produced color in those spotprinted areas, by application of a solution of the chromogenic material. In the case of phenolic polymer, a printing ink may be made of up to 75 per cent, by weight, of the phenolic polymer material in a petroleum-based solvent; —the ink being built to a viscosity suitable for printing purposes. The relative amounts of reactive, mark-forming, components to be used in practice of this invention, are those most convenient and economical amounts consistent with adequate, desired or required visibility of the recorded data. The resolution of the recorded data is dependent on, among other things, particle or capsule size, distribution and amount of particles or capsules, liquid solvent migration, chemical reaction efficiency, and other factors, all of which can be optimized empirically by one skilled in the art.

In the system of this invention the acidic mark-forming material reacts with the chromogenic materials to effect distinctive dark-color formation. In a multi-sheet system in which an acidic organic polymer is employed, it is desirable to include other materials to supplement the polymer reactants. For example, kaolin can be added to improve the transfer of the liquid and/or the dissolved materials between the sheets. In addition, other materials such as bentonite, attapulgite, talc, feldspar, halloysite, magnesium trisilicate, silica gel, pyrophyllite, zinc sulfate, calcium sulfate, calcium citrate, calcium phosphate, calcium fluoride, barium sulfate and tannic acid can be included.

An example of the compositions which can be coated onto the receiving surface of an underlying sheet of a multi-sheet to react with a capsule coating on the underside of an overlying sheet is as follows:

| Coating Composition | Percent by Weight |
|---|---|
| Phenolic polymer mixture | 17 |
| Paper coating Kaolin (white) | 57 |
| Calcium carbonate | 12 |
| Styrene butadiene latex | 4 |
| Ethylated starch | 8 |
| Gum arabic | 2 |
|  | 100 |

Having disclosed, generally, the mixtures of chromogenic compounds of this invention and preferred methods for utilizing the mixtures of chromogenic compounds, in combination with other materials, as reactive components in mark-forming record material; examples will now be disclosed wherein preparation of several of the mixtures of chromogenic materials is described.

EXAMPLE 1

(6'-diethylamino-2'-thiomethylfluoran)

The intermediate 2'-carboxy-4-diethylamino-2-hydroxy benzophenone (I) used in this series of synthesis was prepared by known methods [Beilstein; "Handbuch der Organischen Chemie"; vol. 14, page 675; ibid; vol. 14, Supplement 1, p. 710 and J. American Chemical Society, 38, 2102].

To a cooled mixture of 0.62 g. of (I)(0.002 mole) and 0.28 g. (0.002 mole) of 4-thiomethylphenol was added 4 ml. of cold (5° C) 96% sulfuric acid. The mixture was allowed to warm to room temperature over 1.5 hours and maintained at that temperature for 18 additional hours.

The blue reaction solution was poured on to 100 g. of ice and slowly brought to pH 10.5 with 20% sodium hydroxide solution. The product was extracted into benzene. The benzene solution was treated with 1 g. of Norite A, (an activated charcoal), dried over sodium sulfate and evaporated under reduced pressure to leave 0.30 g. of crude product, m.p. 94°–98° C. Recrystallization from benzene-heptane gave pure product, m.p. 161°–162° C.

EXAMPLE 2

(6'-diethylamino-3'-methyl-2'-thiomethylfluoran)

The reaction was carried out as in Example 1 for a period of 22 hours. The crude product (m.p. 123°–126° C) isolated as above was purified by chromatography on alumina to give pure product, m.p. 162°–163° C.

EXAMPLE 3

(6'-diethylamino-2'-methylsulfoxide fluoran)

A mixture of 1.26 g. (0.004 mole) of I and 0.78 g. (0.005 mole) of 4-methylthiophenol sulfoxide and 10 ml. of 96 percent sulfuric acid was maintained at 90° C for 22 hours.

The reaction solution was worked-up as described in Example 1 to give product, m.p. 120°–125° C.

EXAMPLE 4

(6'-diethylamino-2'-methylsulfoxide fluoran)

The reaction was carried in the same manner as Example 3. The crude product was purified by chromatography on alumina to give 25 percent yield of purified product, m.p. 118°–122° C.

The melting points, absorption maximum and color for these prepared compounds are as follows:

Table I

| COMPOUND | MELTING POINT °C | ABS. MAX. mμ | COLOR[1] |
|---|---|---|---|
| 1 | 151–153 | 550, sh 430 | red |
| 2 | 162–163 | 530 | red |
| 3 | 120–125[2] | 555 sh 525 | red |
| 4 | 118–122 | 500 sh 525 | orange-red |

[1]Color developed on application of benzene solution to a paper coated with phenolic resin. Slight hypsochromic shifts, but essentially the same colors, resulted when applied to a paper coated with attapulgite Clay. The colors show good resistance to fade on exposure to light. For example, compound 1 shows only 12% fade after 24 hours exposure to a daylight fluorescence light source.
[2]Compound contains solvent of

What is claimed is:

1. A colorless, but colorable chromogenic compound represented by the formula:

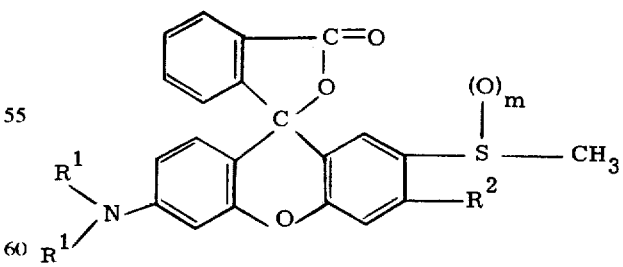

wherein each $R^1$ is hydrogen, methyl or ethyl; each $R^2$ is hydrogen, methyl, or ethyl and $m$ is zero or the integer one.

2. A compound according to claim 1 wherein said compound is 6'-diethylamino-2'-thiomethylfluoran; 6'-diethylamino-3'-methyl-2'-thiomethylfluoran; or 6'-diethylamino-2'-methylsulfoxidefluoran.

* * * * *